United States Patent [19]

Timmerman

[11] Patent Number: 5,575,668

[45] Date of Patent: Nov. 19, 1996

[54] TEMPORARY POWER/DATA TAP

[76] Inventor: Paul Timmerman, 5528 324th Pl. SE., Fall City, Wash. 98024

[21] Appl. No.: 544,789

[22] Filed: Oct. 6, 1995

[51] Int. Cl.$^6$ ............................................. H01R 13/44
[52] U.S. Cl. ............................................. 439/131; 174/48
[58] Field of Search ................................. 439/131, 535; 174/48, 52, 53

[56] References Cited

U.S. PATENT DOCUMENTS

| | | | |
|---|---|---|---|
| 3,646,244 | 2/1972 | Cole | 174/57 |
| 3,992,070 | 11/1976 | Dunn et al. | 312/320 |
| 4,747,788 | 5/1988 | Byrne | 489/131 |
| 4,778,399 | 10/1988 | Schenk | 174/48 X |
| 4,984,982 | 1/1991 | Brownlie et al. | 174/48 X |
| 5,008,491 | 4/1991 | Bowman | 174/48 |
| 5,122,069 | 6/1992 | Brownlie et al. | 439/131 |
| 5,230,552 | 7/1993 | Schipper et al. | 439/131 X |

*Primary Examiner*—P. Austin Bradley
*Assistant Examiner*—Daniel Wittels

*Attorney, Agent, or Firm*—Craine & Jackson, P.S.

[57] ABSTRACT

A temporary power/data tap for delivering both electrical power and data service line to a work surface from a distant standard wall or floor mounted electrical receptacle and data port. The power/data tap is designed to be selectively moved between retract and extended positions to provide electrical power and data service line to the work surface. The power/data tap is a self-contained unit designed for easy installation on the work surface which meets or exceeds United Laboratory standards. At least one electrical receptacle and one data port is mounted on a pivoting outlet enclosure housed inside an enclosure assembly. The electrical receptacle and data port are disposed in two separate compartments formed in the outlet enclosure. A power cord capable of being plugged into a standard wall or floor receptacle delivers electrical power to one side of the enclosure assembly. A power distribution assembly located inside the enclosure assembly then safely distributors the electrical power inside the enclosure assembly. Optional electrical connectors and interconnecting cable is provided for electrical power from one power/data tap to another.

20 Claims, 6 Drawing Sheets

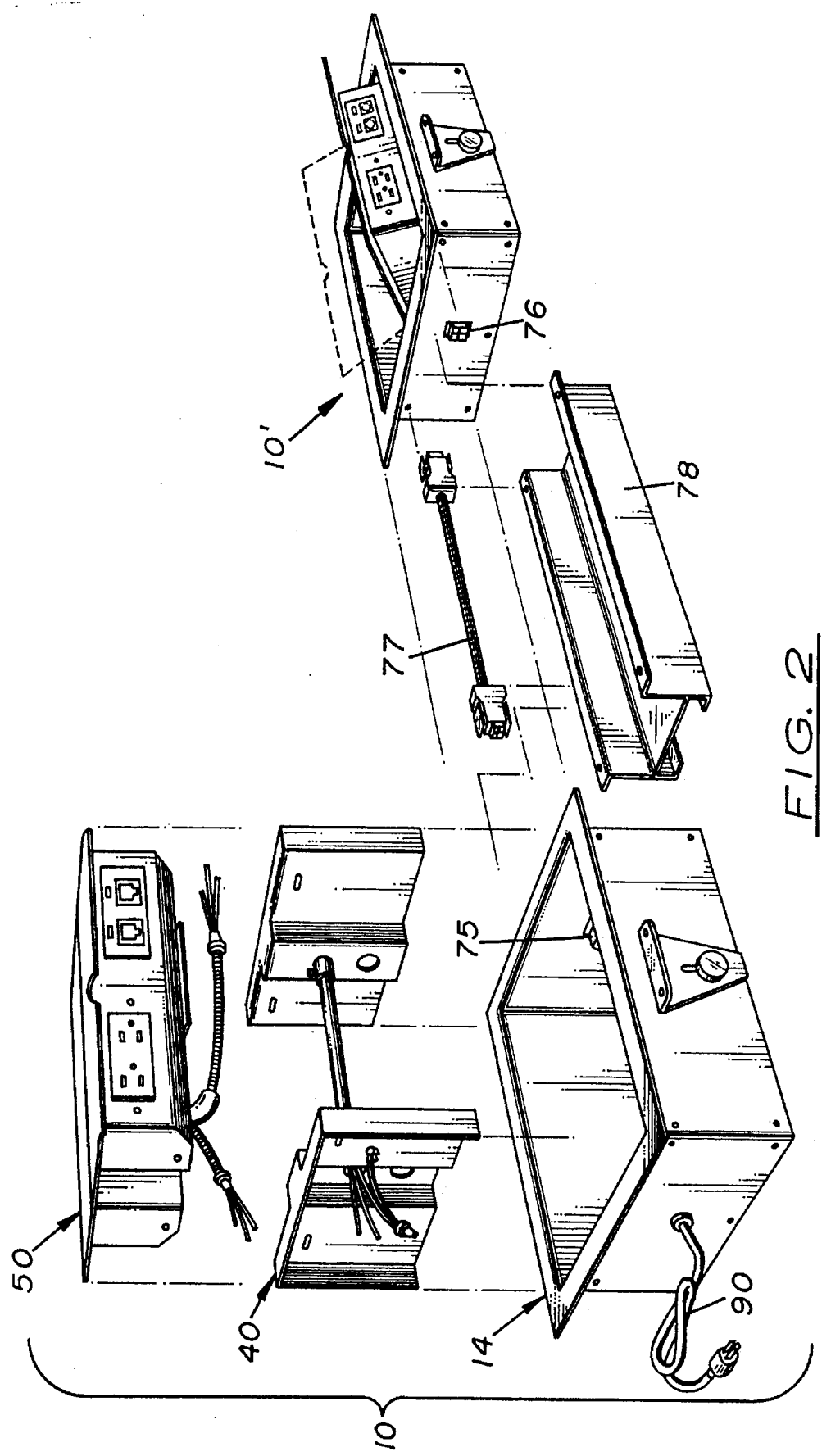

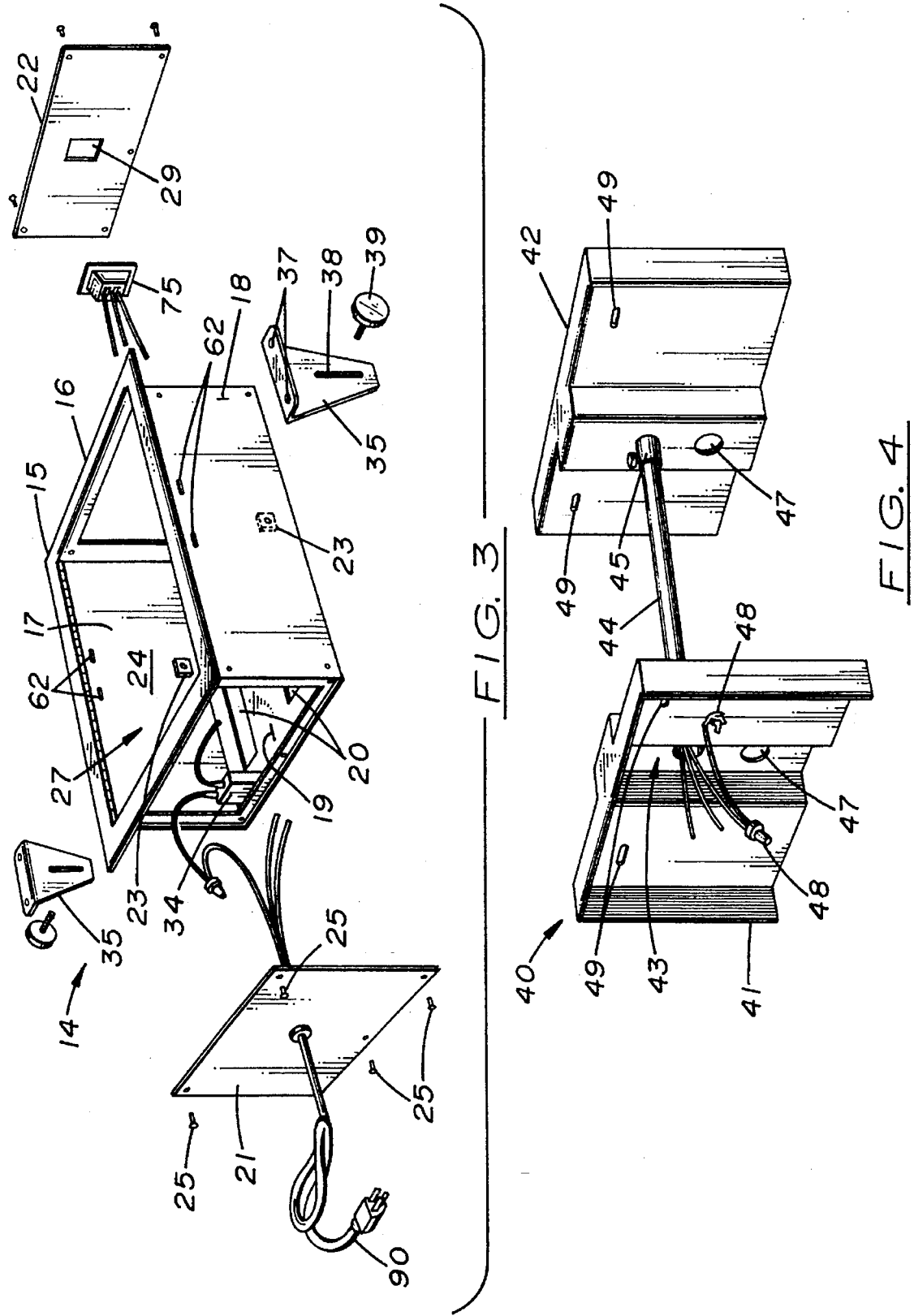

TEMPORARY POWER/DATA TAP

BACKGROUND OF THE INVENTION

1. Field of the Invention

The invention disclosed herein relates to electrical connectors and, more particularly, to temporary electrical/data tap connectors.

2. Description of the Related Art

Electrical power cords with multiple electrical receptacles and a built-in circuit breaker are relatively common. Such devices, called "Temporary Electrical Taps" by Underwriters Laboratories, Inc., are used to temporarily deliver electrical power from a standard electrical receptacle located on the wall or floor adjacent to the work surface. Typically, the temporary electrical taps are plugged into the electrical receptacle and then disposed along the floor directly under the work surface. Electrical power cords from the electrical devices used on the work surface are then plugged into the electrical receptacles located on the temporary electrical tap.

Today, many of the electrical devices located on a work surface, such as a fax machine and modem, must be connected to a data port. Usually, the data port is located on the floor or wall adjacent to the work surface. A separate data service line from the electrical device must run across the work surface, along the wall and floor, and connect to the data port.

A device which delivers both electrical power and data line service to a work surface, hereinafter called a temporary power/data tap, would be highly desirable. Such a device which could be connected to a distant standard electrical receptacle or data port and easily installed in a convenient location on or below the work surface without requiring special duct work or conduit would be highly desirable. Also, such a device which could be selectively opened to provide electrical and/or data service line or selectively closed to provide more work surface area would be highly desirable. Further, such a device which could be electrically connected to another temporary power/data tap installed on the work surface to provide extended service thereto would be highly desirable. Still further, such a device which could be used to deliver both high voltage power and low voltage data service line that meets or exceeds local and national electrical codes and United Laboratory, Inc. standards would be highly desirable.

SUMMARY OF THE INVENTION

The herein describe invention is intended to address the above stated objects and other objects which will be apparent.

Disclosed herein is a temporary power/data tap designed to temporarily deliver electrical power and data service from a standard electrical receptacle and data port located in a wall or floor located near a work surface. The temporary power/data tap is also designed for easy installed directly into the work surface and does not require additional duct work or conduit. Also, the temporary power/data tap acts as a housing and shielding device for high and low voltage electrical connections.

Briefly, the temporary power/data tap is completely made of metal and comprises an enclosure assembly, a power distribution assembly, at least one outlet enclosure with at least one electrical receptacle and one data plug attached therein, and a power cord. The enclosure assembly includes a box structure capable of fitting through a suitable size opening formed at a desired location on the work surface. The enclosure assembly is designed to serve as a closed, protective housing for the power distribution and the outlet enclosure assembled there. A means for mounting means the enclosure assembly to the work surface is also provided.

The outlet enclosure acts as a second, protective housing for a plurality of electrical receptacles and data ports placed therein which can be selective rotated inside the enclosure assembly between retracted and extended positions. The outlet enclosure is disposed inside the enclosure assembly and pivotally attached thereto by a pivoting means, such as a hinge. The outlet enclosure includes a closed, lower box member divided into two, separate first and second compartments. The first compartment contains at least one electrical receptacle while the second compartment contains at least one data port.

Disposed inside the enclosure assembly directly below the outlet enclosure is the power distribution assembly which is designed to safely receive and distribute electrical power through the enclosure assembly. The power distribution assembly is also designed to isolate and ground the electrical power thereby protecting the data service line from radio frequency and magnetic interference. The power distribution assembly is an I-shaped structure that includes a first junction box and a second junction box joined together by a rigid conduit. During assembly the power distribution assembly is disposed inside the enclosure assembly so that the junction boxes are located opposite sides of the enclosure assembly.

The power cord, designed to be plugged into a standard wall or floor mounted electrical receptacle, delivers electrical power to one side of the enclosure assembly adjacent to the first junction box. The connecting wires in the power cord are electrically connected to the ends of the first set of electrical wires located in the first junction box and which extend through the rigid conduit to the second junction box to safely deliver electrical power thereto. A fuse is electrically connected between the power cord and the first set of wires to provide protection for electrical shorts. A flexible conduit is used to deliver a second set of wires to each outlet enclosure.

The temporary power/data tab can use one or two outlet enclosures. Each outlet enclosure is connected to a flexible conduit which contains a second set of electrical wires designed to deliver electrical power from one junction boxes to the first compartment on the outlet enclosure. An wire port opening is also provide on each outlet enclosure through which the data service line may be extended to connect to the data port located in the second compartment.

An optional electrical connector may be connected to the side of the enclosure assembly adjacent to the second junction box. The electrical connector is connected to the first set of wires and may be attached to an interconnecting cable to provide electrical service to an adjacent temporary power/data tap. A shield-like cable manager may also provided to protect and shield the interconnecting cable.

BRIEF DESCRIPTION OF THE DRAWINGS

FIG. 2 is a perspective, exploded view of the temporary power/data tap attached to an adjacent temporary power/data tap.

FIG. 3 is a perspective, exploded view of the enclosure assembly.

FIG. 4 is a perspective view of the power distribution assembly.

DESCRIPTION OF THE PREFERRED EMBODIMENT(S)

Figure 1:
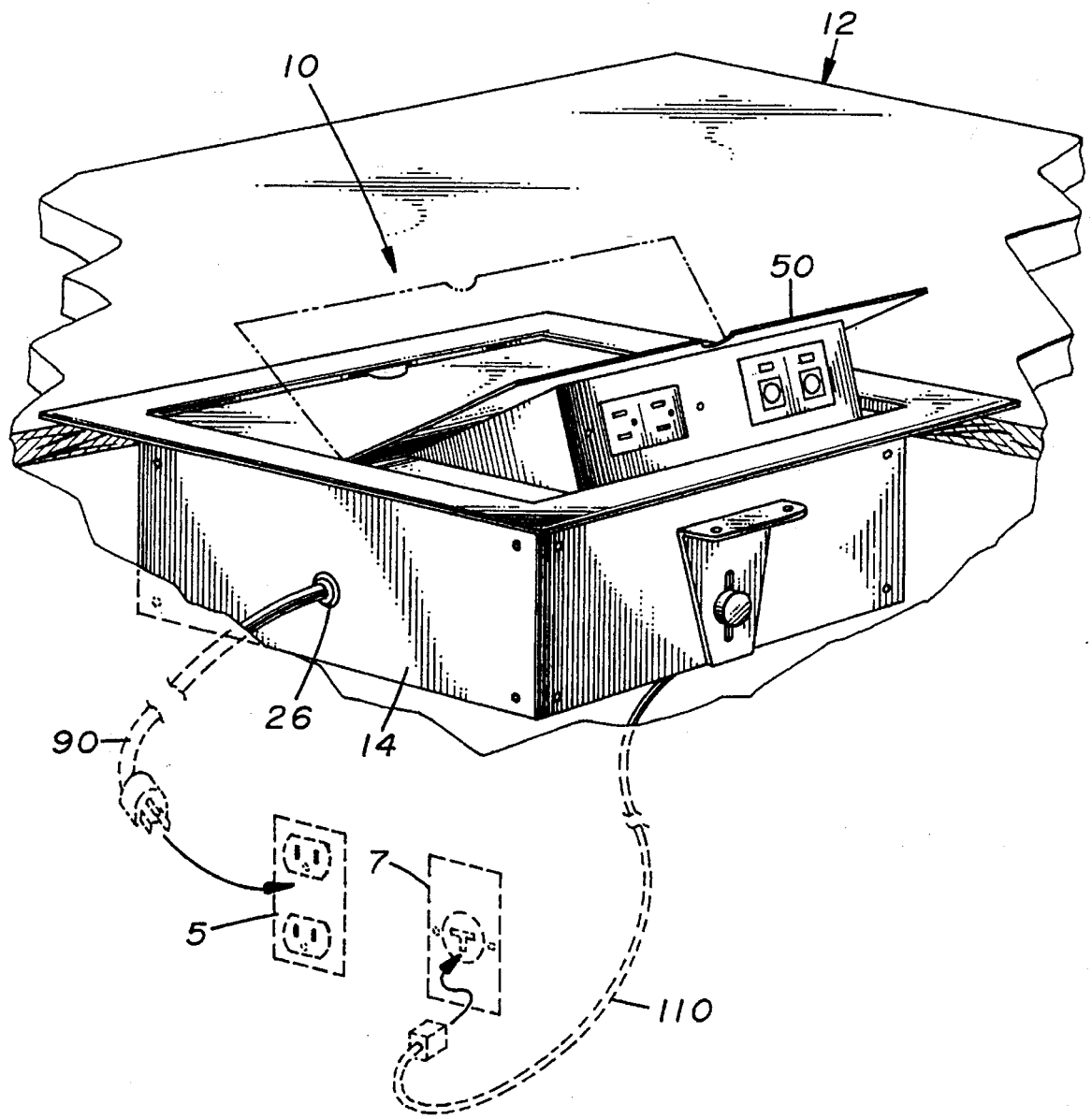
FIG. 1 is a perspective view of the temporary power/data tap disclosed herein attached to a work surface.

Shown in the accompanying FIGS. 1–9, there is shown a temporary power/data tap generally referred to as 10, designed to safely provide electrical power and data service line to a work surface 12. The temporary power/data tap 10 is designed to be easily installed into the work surface which can be selectively extended from the work surface to provide service. When service is no longer desired, the temporary power/data tap 10 can be easily moved into a retracted position thereby enabling the user to use the entire work surface 12. The temporary power/data tap 10 is also designed to provide electrical power and data service from a standard electrical receptacle and data port located in a wall or floor located a short distance away from the work surface.

The temporary power/data tap 10 includes an enclosure assembly 14, a power distribution assembly 40, and at least one outlet enclosure 50, and a power cord 90. As shown more clearly in FIG. 3, the enclosure assembly 14 comprises a box structure 15 having a top opening 27 with an integrally attached bezel 16, two sides surfaces 17, 18 and two removable end surfaces 21, 22. The bottom surface 19 has slots 20 or holes (not shown) to provide access to the non-conductor space 24 located inside the enclosure assembly 14. The box structure 15 is made of 1/32 inch thick steel approximately 12 inches in length, 10 inches in width and 4 inches deep. The bezel 16 is made of 1/8 inch steel welded at its corners and spot welded to the side surfaces 17, 18. The end surfaces 21, 22 are removably connected to the side surfaces 17, 18 via threaded connectors 25. The sides surfaces 17, 18 and bottom surface 19 are made of thin steel plate material with a mounting frame (not shown) welded into the edges. The side surfaces 17, 18 also have nuts 23 spot welded on their inside surfaces which are used for mounting the enclosure assembly 14 to the work surface. The inside surface of the side surfaces 17, 18 of the box structure 15 has rivets 62 intruding into the non-conductor space 24 which serve as positive stops for the outlet enclosure 50 housed therein. The end surfaces 21, 22 have openings for receiving a strain relief bushing 26 or an electric connector 75.

Manufactured on the bottom surface 19 of the box structure 15 is a circuit breaker opening (not shown) through which a circuit breaker 34 may be inserted. The circuit breaker 34 is electrical connected to the electrical circuit inside the enclosure assembly to provide supplemental protection. The circuit breaker 34 is rated at 15A, 125V minimum.

Disposed inside the enclosure assembly 14 is the power distribution assembly 40 designed to safely receive and distribute electrical power through the enclosure assembly 14 and to the outlet enclosure 50. As shown more clearly in FIG. 4, the power distribution assembly 40 is an "I-shaped" structure comprising a first junction box 41 and a second junction box 42. Each junction box 41, 42 is made of sheet metal with lateral and bottom openings and front, rear and top surfaces. Each junction boxes 41, 42 has a recessed central area 43 with two central located conduit holes 47 manufactured thereon which are used to attach one end of the metallic rigid conduit 44 and a metallic flexible conduit 73. Trade holes 49 are also manufactured on the inside surface near the upper edge of each junction box 41, 42 which engage bullet catches 56 located on the lateral sides of each outlet enclosure 50 to limit the upward rotation of the outlet enclosure 50 from the enclosure assembly 14.

Figure 5:
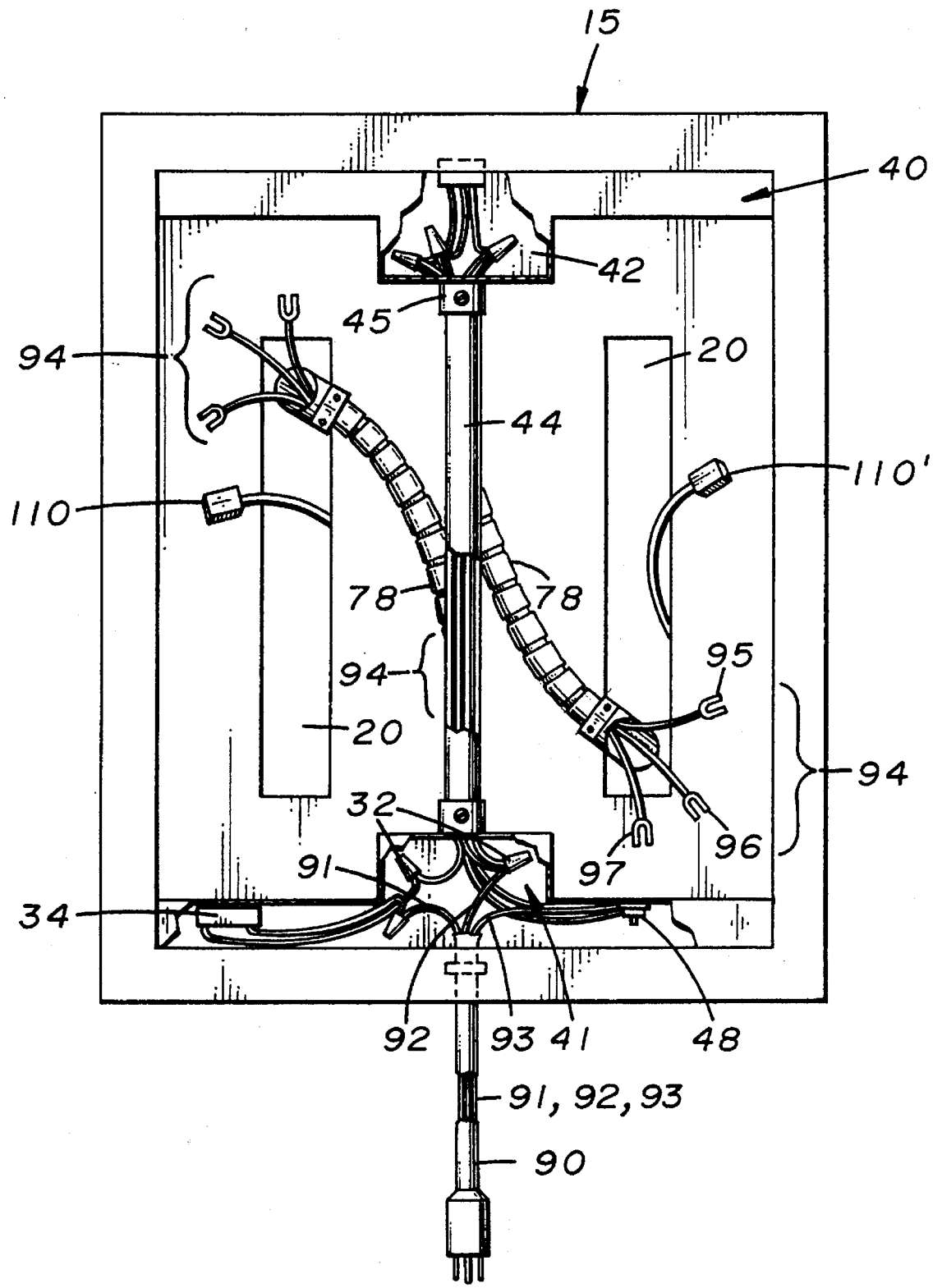
FIG. 5. is a plan view of the invention showing the power distribution assembly disposed inside the enclosure assembly.

During assembly, the power distribution assembly 40 is disposed inside the enclosure assembly 14 over the bottom surface 19 so that the rigid conduit 44 and parallel with the longitudinal axis of the enclosure assembly 14 with the junction boxes 41, 42 disposed on opposite ends thereof as shown in FIG. 5. In the preferred embodiment, rigid conduit 44 is EMT type conduit with conduit fittings 45 used to attach the rigid conduit 44 to the junction boxes 41, 42. A ground screw 48 is attached to the sides of the first junction box 41 for attaching the "green" ground wire thereto.

Electrical power is delivered to the enclosure assembly 14 from a standard receptacle 5 via the power cord 90 which contains three conductors, 91, 92, 93. The power cord 90 extends through the bushing 26 attached to the side surface 17 of the box structure 15. In the preferred embodiment, the power cord 90 is a 14 AWG, Type SJT or SJO or SJTO, and three conductors 91–93 measuring between 24 and 180 inches in length. As shown in FIG. 5, the three connectors 91–93 terminate inside the first junction box 41. The end of the hot "black" wire 91 is connected to the circuit breaker 34 attached to the bottom surface 19 of the enclosure assembly 14. The neutral "white" wire 92 is connected by a wire nut 32 to the neutral "white" wire 96 in the first set of conductors 94. The "white" wire 96 is then extended through the rigid condiut 44 to the second junction box 41. The "hot" black wire 95 on the first set of wires 94 is connected to the circuit breaker 34 and then extended through the rigid conduit 44 to the second junction box 41. The "green" ground wire 93 is connected to the ground screw 48. The "green" ground wire 97 in the first set of wires 94 is connected at one end to the ground screw 48 and then extend through the rigid conduit 44 to the second junction box 41. A second set of wires 98 is then connected to the power cord conductors and the conductors in the first set of wires 94 to deliver electrical power from each junction box 41, 42 through the flexible conduit 73, to one outlet enclosure 50.

Figure 8:
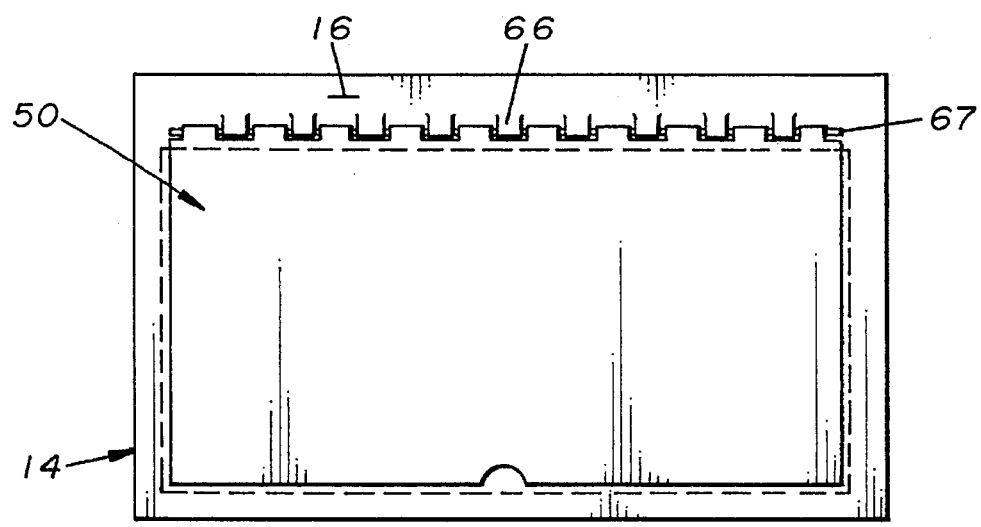
FIG. 8 is a top plan view of the temporary power/data tap with one outlet enclosure disposed inside the enclosure assembly.
Figure 9:
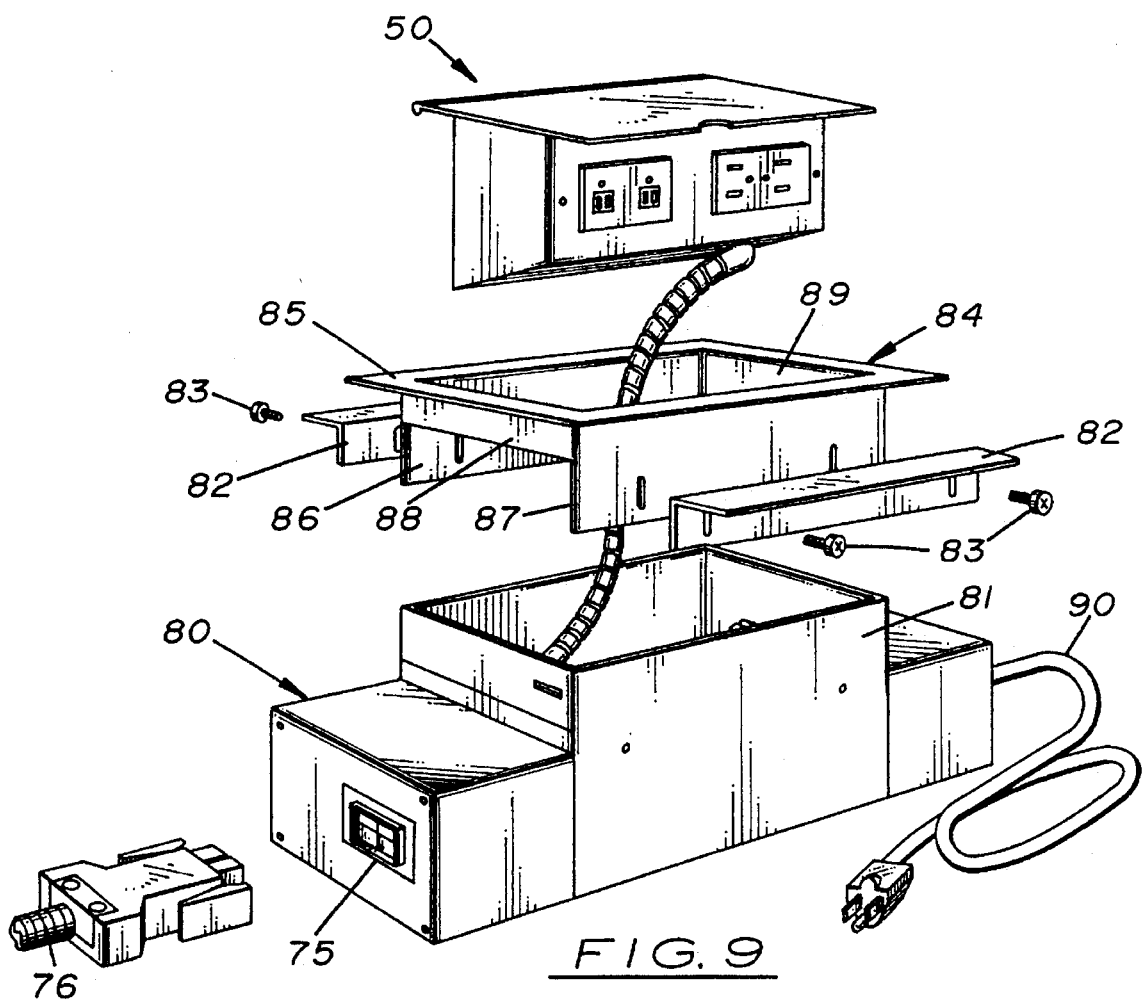
FIG. 9 is perspective view of a second embodiment of the temporary power/data tap.

In the embodiment shown in FIGS. 1 and 2, two outlet enclosures 50, 50' are placed through the top opening 27 and disposed in a side-by-side manner inside the enclosure assembly 14. FIGS. 8 and 9 show one outlet enclosure 50 disposed inside the enclosure assembly. With both embodiments, a hinge 66 is disposed either between the two outlet enclosures 50, 50' or between one outlet enclosure 50 and the enclosure assembly 14 thereby enabling them to pivot freely inside the enclosure assembly 14.

Figure 6:
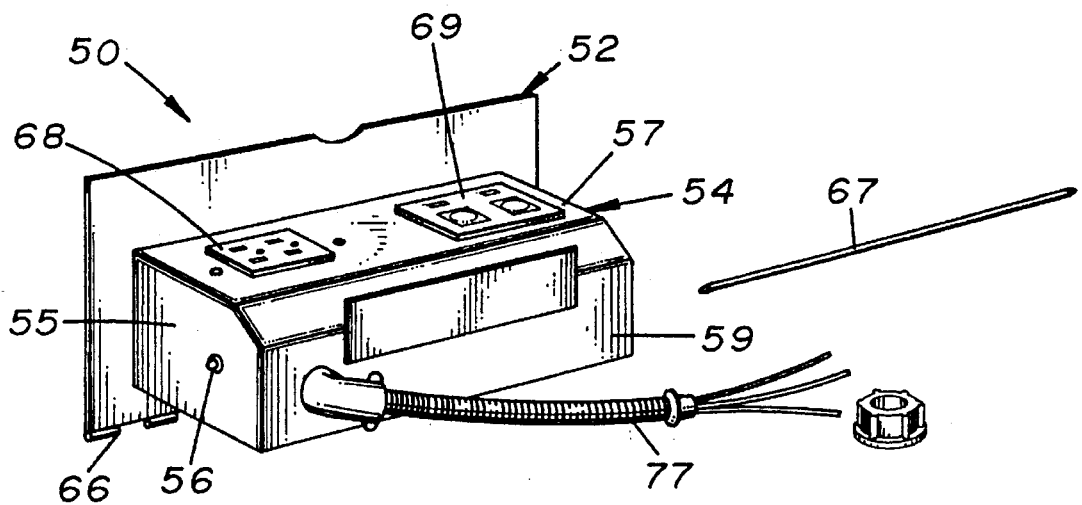
FIG. 6. is a perspective view of the outlet enclosure showing the front and bottom surfaces thereof.
Figure 7:
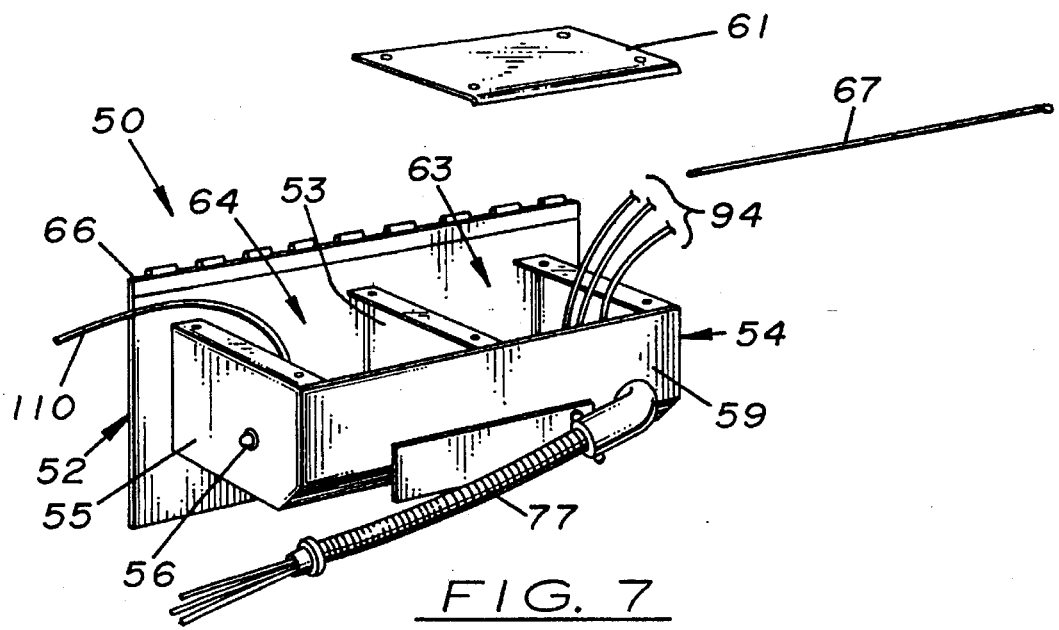
FIG. 7 is a perspective view of the outlet enclosure shown in FIG. 6 showing the rear and bottom surface thereof.

As shown in FIGS. 6 and 7, each outlet enclosure (50 shown) is made of sheet metal and comprises a cover 52 and a box member 54 divided by a partition 53 into a first and second compartment, 53, 54, respectively. The cover 52 is connected along its back edge by a full length hinge 66 to the top surface of the box member 54. A connecting rod 67 is used to interconnect the hinge elements on the cover 52 with the hinge elements located on an adjacent outlet enclosure or on the enclosure assembly. The box member 54 is divided into a first compartment 63 used to house with high voltage electrical connections, and a second compartment 64, used to house low voltage electrical connnections, such as data service line connections. Each end 55 of the box member 54 is fitted with a bullet catch 56 which engage trade holes 49 manufactured on the sides of the adjacent junction box to limit the upward rotation of the outlet enclosure 50. Manufactured on the front surface 57 of the box member 54 are cutouts 58 for receiving the electrical power receptacle 68 and data port 69. Manufactured on the bottom surface 59 of the box member 54 directly under the first compartment 63 is a suitable opening (not shown) which enables the flexible conduit 73 to be attached to the box structure 54. A conduit fitting 72 is used to securely attach the flexible conduit 73 to the box structure 54. Attached over the rear opening 60 of the box member 54 is a removable cover 61. The cover 61 fully encloses the first compartment 63 and partially covers the rear opening 65 of the4 second compartment 64 thereby providing a means for data service line to enter the second compartment 64.

The distal end of each flexible conduit 73 is attached to the lower conduit hole 47 located on one of the junction boxes. As stated above, a second set of wires 98 are then connected either to the power cord 90 or to the first set of wires 94 and run between one junction box to one outlet enclosure Suitable wire nuts 32 are used to connect the individual conductors together. Once delivered to the outlet enclosure 50, the second set of wires 94 is connected to the electrical power while the data service line 110 is connected to the data port 69.

To mount the temporary power/data tap 10 to a work surface 12, a suitable opening 13 must be manufactured on the work surface slightly larger than the box structure 15. The box structure 15 is then inserted through the opening 13 and attached to the bottom surface of the work surface 12 via two mounting brackets 35. Each mounting bracket 35 has a flange surface 36 with two mounting holes 37 formed therein. A slot 38 is manufactured on the face of each mounting bracket 35 through which a thumb screw 39 may be inserted to provide an attachable attachment means. Suitable connectors (not shown) are then inserted through mounting holes 37 to attach the mounting brackets 35 to the work surface 12.

FIG. 9 shows another embodiment of the temporary power/data tap 10 in which the enclosure assembly includes a modified box structure 80 and a separate skirt assembly 84. The skirt assembly 84 includes a bezel 85 with two side surfaces 86, 87 and two end surfaces 88, 89. The modified box structure 80 has an elevated central area 81 in which a outlet enclosure 50 (only one shown) is placed as described with box structure 14. During assembly, the skirt assembly 84 slides downward over the central area 81. Two L-shaped angles 82 are then disposed on opposite sides of the skirt assembly 84. Threaded connectors 83 are used to attach the angles 82, skirt assembly 84, and modified box structure 80 together. Slots (not shown) formed in the skirt assembly 84 and the angles 82 enable the skirt assembly 84 to be adjusted vertically on the modified box structure 80.

In temporary power/data tap 10 is can be used as a single unit to provide electrical and data service line to one location on a work surface 12. As shown in FIG. 2, the temporary power/data tap 10 can be modified to make it connectable to additional temporary power/data taps 10' to provide extended service to other areas on the work surface 12. To provide such extended service, a quick connector 75 is attached to the end surface 22 of the box structure 15 opposite the end surface in which the power cord 90 enters the box structure 15. On the adjacent temporary power/data tap 10', the power cord 90 is replaced with a second quick connector 76 and an interconnecting cable 77. After installing the two temporary power/data taps 10, 10' on the work surface, the interconnecting cable 77 is then connected at one end to the quick connector 75 and to the second quick connector 76 on the adjacent temporary power/data taps 10'. A cable manager 78 is disposed between the adjacent temporary power/data taps 10, 10' to provide additional protection.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A temporary power/data tap, comprising:
   a. an enclosure assembly capable of being attached to a work surface, said enclosure assembly having a top opening;
   b. a power cord capable of attaching to a standard electrical receptacle and delivering electrical power to said enclosure assembly;
   c. a data service line capable of attaching to a standard data port to deliver data communication service to said enclosure assembly;
   d. a power distribution assembly located inside said enclosure assembly capable of safely receiving and delivering said electrical power delivered by said power cord to said enclosure assembly, said power distribution assembly also capable of isolating and grounding said electrical power from said data service line thereby reducing radio frequency and magnetic interference therein;
   e. at least one outlet enclosure pivotally attached inside said enclosure assembly, said outlet enclosure including a lower box member having a top cover, a front cover and being divided into a first and second compartments, said outlet enclosure capable of being be selectively rotated inside said enclosure assembly thereby enabling said lower box member to be moved between a retracted and extended positions through said top opening in said enclosure assembly;
   f. at least one electrical receptacle disposed inside said first compartment in said lower box member of said outlet enclosure, said electrical receptacle being connected to said electric power delivered by power distribution assembly; and,
   g. at least one data port disposed inside said second compartment in said lower box member of said outlet enclosure, said data port being connected to said data service line delivered to said enclosure assembly.

2. A temporary power/data tap, as recited in claim 1, wherein said enclosure assembly includes a box structure with a integrally attached bezel.

3. A temporary power/data tap, as recited in claim 2, further including a mounting means for adjustably mounting said temporary power/data tap to a work surface.

4. A temporary power/data tap, as recited in claim 1, wherein said enclosure assembly includes an upper skirt assembly and a lower box structure, said skirt assembly including a bezel and perpendicularly aligned side members, said lower box structure having an elevated central area, said skirt assembly capable of being adjusted on said lower box structure.

5. A temporary power/data tap, as recited in claim 4, further including a mounting means for adjustably mounting said temporary power/data tap to a work surface.

6. A temporary power/data tap, as recited in claim 5, wherein said means for mounting said enclosure assembly under said work surface includes two L-shaped brackets adjustably attached to opposite sides of said skirt assembly, said L-brackets capable of being selectively attached to the work surface to attach said enclosure assembly thereto.

7. A temporary power/data tap, as recited in claim 1, wherein said power distribution assembly includes a first junction box and a second junction boxes separated and connected together by rigid conduit, said power distribution assembly also including a set of wires located between said first and second junction boxes and disposed inside said rigid conduit and a second set of wires located between each said junction box and each said outlet enclosure, said power distribution assembly further including a flexible conduit disposed over each said second set of wires.

8. A temporary power/data tap, as recited in claim 7, further including an electrical connector attached to said enclosure assembly, said electrical connector being connected to said first set of wires terminated in said second junction box, said electrical connector capable of being connected to an interconnecting cable to deliver electrical power to an adjacent temporary power/data tap.

9. A temporary power/data tap, as recited in claim 8, further including a cable manager over said interconnecting cable disposed between adjacent said temporary power/data taps capable of protecting and shielding said interconnecting cable.

10. A temporary power/data tap, as recited in claim 7, a circuit breaker disposed inside said temporary power/data tap and electrically connected to said power cord.

11. A temporary power/data tap, comprising:

a. an enclosure assembly having a top opening;
   b. means for mounting said enclosure assembly under a work surface with said top opening being placed in a suitable opening formed in the work surface;
   c. a power cord capable of attaching to a standard electrical receptacle and delivering electrical power to said enclosure assembly;
   d. a power distribution assembly disposed inside said enclosure assembly capable of safely receiving and distributing said electrical power delivered by said power cord to said enclosure assembly, said power distribution capable of isolating and grounding said electrical power from said data service line thereby reducing radio frequency and magnetic interference therein;
   e. at least one outlet enclosure placed inside said enclosure assembly, said outlet enclosure being pivotally attached along one edge to said enclosure assembly thereby enabling said outlet enclosure to rotate therein between an extended and retracted positions from said top opening in said enclosure assembly, said outlet enclosure having a front cover and a top cover and being divided into two isolated, first and second compartments;
   f. at least one electrical receptacle attached to said outlet enclosure and disposed in said first compartment, said electrical receptacle capable of being electrically connected to said power cord to deliver electrical power;
   g. at least one data service line capable of attaching to a standard data port and delivering data communication line service to said enclosure assembly;
   h. at least one data port attached to said front surface of said lower box member over said second compartment, said data port capable of being connected to a data service line; and,
   i. a circuit breaker disposed inside said temporary power/data tap and electrically connected to said power cord.

12. A temporary power/data tap, as recited in claim 11, wherein said enclosure assembly includes a lower box structure with an integrally attached upper bezel, said lower box structure capable of housing said outlet enclosure and said power distribution assembly therein, said bezel being disposed on the top surface of a work surface when said temporary power/data tap is inserted through a suitable opening formed on the work surface to hold said temporary power/data tab therein.

13. A temporary power/data tap, as recited in claim 12, wherein said power distribution assembly includes a first junction box and a second junction boxes separated and connected together by rigid conduit, said power distribution assembly also including a set of wires located between said first and second junction boxes and disposed inside said rigid conduit and a second set of wires located between each said junction box and each said outlet enclosure, said power distribution assembly further including a flexible conduit disposed over each said second set of wires.

14. A temporary power/data tap, as recited in claim 13, wherein said means for mounting said enclosure assembly under said work surface includes two mounting brackets adjustably attached to opposite sides of said lower box structure, said mounting brackets capable of being selectively attached to the lower surface of the work surface to securely attach said temporary power/data tap thereto.

15. A temporary power/data tap, as recited in claim 11, wherein said enclosure assembly includes an upper skirt assembly and a lower box structure, said skirt assembly including a bezel and perpendicularly aligned side members, said lower box structure having an elevated central area, said skirt assembly capable of being adjusted on said lower box structure.

16. A temporary power/data tap, as recited in claim 15, wherein said power distribution assembly includes a first junction box and a second junction boxes separated and connected together by rigid conduit, said power distribution assembly also including a set of wires located between said first and second junction boxes and disposed inside said rigid conduit and a second set of wires located between each said junction box and each said outlet enclosure, said power distribution assembly further including a flexible conduit disposed over each said second set of wires.

17. A temporary power/data tap, as recited in claim 16, wherein said means for mounting said enclosure assembly under said work surface includes two, longitudinally aligned, L-shaped brackets adjustably attached to opposite sides of said box structure, said mounting brackets capable of being selectively attached to the work surface to attach said power data tap thereto.

18. A temporary power/data tap, as recited in claim 17, further including an electrical connector attached to said first set of wires in said second junction box, said electrical connector capable of connecting to a suitable electrical connecting means capable to safely deliver electrical power to an adjacent temporary power/data tap.

19. A temporary power/data tap, as recited in claim 18, further including a raceway disposed between adjacent said temporary power/data tap capable of shielding said interconnecting cable.

20. A temporary power/data tap, as recited in claim 17, further including a fuse electrically connected between said power cord and said electrical receptacles in said outlet enclosures.

* * * * *